US008704801B2

(12) United States Patent
Tsai et al.

(10) Patent No.: US 8,704,801 B2
(45) Date of Patent: Apr. 22, 2014

(54) TOUCH DISPLAY APPARATUS AND BACKLIGHT MODULE

(75) Inventors: Han-Wen Tsai, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 859 days.

(21) Appl. No.: 12/882,224

(22) Filed: Sep. 15, 2010

(65) Prior Publication Data
US 2011/0122095 A1 May 26, 2011

(30) Foreign Application Priority Data

Nov. 23, 2009 (TW) ................................ 98139809 A

(51) Int. Cl.
*G06F 3/02* (2006.01)

(52) U.S. Cl.
USPC ............. 345/175; 349/65; 349/113; 345/176; 345/173; 385/43; 359/641

(58) Field of Classification Search
None
See application file for complete search history.

(56) References Cited

U.S. PATENT DOCUMENTS

| | | | |
|---|---|---|---|
| 6,690,363 B2 | 2/2004 | Newton | |
| 6,836,367 B2 | 12/2004 | Seino et al. | |
| 6,867,828 B2 | 3/2005 | Taira et al. | |
| 2006/0279558 A1* | 12/2006 | Van Delden et al. | 345/176 |
| 2008/0089090 A1* | 4/2008 | Bathiche et al. | 362/600 |
| 2009/0295744 A1* | 12/2009 | Onishi | 345/173 |
| 2010/0060611 A1* | 3/2010 | Nie | 345/175 |
| 2010/0231498 A1* | 9/2010 | Large et al. | 345/102 |
| 2010/0259492 A1* | 10/2010 | Chang | 345/173 |
| 2011/0044582 A1* | 2/2011 | Travis et al. | 385/43 |
| 2011/0102372 A1* | 5/2011 | Han et al. | 345/175 |
| 2011/0115747 A1* | 5/2011 | Powell et al. | 345/175 |
| 2011/0199338 A1* | 8/2011 | Kim | 345/175 |

FOREIGN PATENT DOCUMENTS

| | | |
|---|---|---|
| TW | M355612 | 5/2009 |
| TW | M358989 | 6/2009 |

\* cited by examiner

*Primary Examiner* — Kent Chang
*Assistant Examiner* — Benjamin Morales Fernandez
(74) *Attorney, Agent, or Firm* — Jianq Chyun IP Office

(57) ABSTRACT

A touch display apparatus including a light guide plate, a light emitting module, a display panel, a plurality of prism structures, an image transmission unit, and an image detector is provided. The light guide plate has a first surface, a second surface opposite to the first surface, and a light incident surface connecting the first surface and the second surface. The light emitting module includes at least one visible light source and at least one invisible light source. The prism structures are disposed between the first surface and the display panel. The image transmission unit includes a wedge portion and a light guide portion. The wedge portion is disposed between the prism structures and the display panel. The image detector is disposed beside the light guide portion for receiving the invisible light beam from the light guide portion. A backlight module is also provided.

20 Claims, 3 Drawing Sheets

TOUCH DISPLAY APPARATUS AND BACKLIGHT MODULE

CROSS-REFERENCE TO RELATED APPLICATION

This application claims the priority benefit of Taiwan Patent Application serial No. 98139809, filed on Nov. 23, 2009. The entirety of the above-mentioned patent application is hereby incorporated by reference herein and made a part of this specification.

BACKGROUND OF THE INVENTION

1. Field of the Invention

The invention generally relates to a display and a light source module, and more particularly to a touch display apparatus and a backlight module.

2. Description of Related Art

With the advancement of optoelectronic technologies, a user may no longer be satisfied with controlling a computer and objects on screen through a mouse. Accordingly, more user-friendly interface techniques than the mouse have been gradually developed. In the intuitive techniques, a finger-controlled touch interface commanding the computer approximates the natural experiences of human users.

In conventional techniques, a plurality of methods for implementing the touch interfaces has been provided. For example, in 2007 Microsoft Corp. provided a touch controllable computer allowing the user to operate the computer without using a mouse or a keyboard. Instead, the user moves or taps a finger on a table to operate the computer. The touch controllable computer provided by Microsoft mainly includes a plurality of detection cameras, a projector providing a set of projection images, and a set of infrared light sources. The projector projects images onto the table. When a finger or an object touches the screen, the cameras located under the table detect the reflected infrared light from the finger or the object, thereby judging the locations of the finger gestures and the object.

However, since multiple detection cameras, as well as the projector providing the set of projection images, and the infrared light sources are placed inside the table, the entire device is overly bulky, therefore restricting the range of applicability. Even if the components under the table are packaged together, the user, when seated, may not extend his legs because the space near the knees is limited.

Another conventional technique provides that infrared light sources and optical detectors are disposed on an outer frame of a display panel. When a finger touches the display panel, the finger obstructs a path between the infrared light sources and the optical detectors. Accordingly, a dark spot is generated in the images formed on the optical detectors. By deciphering the locations of the dark spots in the images, a relative position of the finger with respect to the display panel is determined. However, this method of determining the finger touch locations by calculating the finger position obstructing the infrared light is not suitable for multi-touch or touch input from multiple users.

In addition, Taiwan Patent No. M355612 provides a table having a touch display screen, the table including a table body, a computer, a short range projector, a plurality of infrared sources, reflection mirrors, infrared cameras, speakers, and a heat dissipation module. The table body has a table surface and a projection screen. When the user touches the screen, the infrared light incident at the touch point is reflected. In a captured image by the infrared camera, a bright spot is formed at the touch point, and is then used by the computer to determine the position of the bright spot.

Taiwan Patent No. M358989 provides a light guide plate, and U.S. Pat. No. 6,867,828 provides a backlight module. U.S. Pat. No. 6,690,363 provides a touch screen, including a display screen for display of data, a plurality of energy transmitters, and a plurality of detectors for detecting energy. U.S. Pat. No. 6,836,367 provides a touch screen including an optical transmitter, a reflection device, an optical receiver, and a driving unit. In this disclosure, the optical transmitter and the optical receiver are arranged along the two neighboring sides.

SUMMARY OF THE INVENTION

The invention provides a touch display apparatus capable of achieving a multi-touch function, and the touch display apparatus has a small profile.

The invention provides a backlight module adapted to a touch display apparatus, and the backlight module may have a small profile and be capable of achieving a multi-touch function.

Other objects and advantages of the invention may be further illustrated by the technical features broadly embodied and described as follows.

An embodiment of the invention provides a touch display apparatus including a light guide plate, a light emitting module, a display panel, a plurality of prism structures, an image transmission unit, and an image detector. The light guide plate has a first surface, a second surface opposite to the first surface, and a light incident surface connecting the first surface and the second surface. The light emitting module is disposed beside the light incident surface, and includes at least one visible light source and at least one invisible light source. The visible light source is capable of emitting a visible light beam, and the invisible light source is capable of emitting an invisible light beam. The display panel is disposed at a side of the first surface. The prism structures are disposed between the first surface and the display panel. The image transmission unit includes a wedge portion and a light guide portion. The wedge portion is disposed between the prism structures and the display panel. The light incident surface, the first surface, the prism structures, the wedge portion, and the display panel are capable of being passed through in sequence by the visible light beam and the invisible light beam. A touch object reflects the invisible light beam from the display panel when the touch object approaches the display panel, so that the invisible light beam passes through the display panel, the wedge portion, and the light guide portion in sequence. The image detector is disposed beside the light guide portion and capable of receiving the invisible light beam from the light guide portion.

According to another embodiment of the invention, a backlight module adapted to a touch display apparatus is provided, including the aforementioned light guide plate, the light emitting module, the prism structures, the image transmission unit, and the image detector. The prism structures are disposed on the first surface and configured between the first surface and the wedge portion. A touch object reflects the invisible light beam from the wedge portion when the touch object approaches the wedge portion, so that the invisible light beam passes through the wedge portion and the light guide portion in sequence.

In summary, the embodiment or the embodiments of the invention may have at least one of the following advantages. According to embodiments of the invention, the touch display apparatus and the backlight module adopt the image transmission unit so that the invisible light beam reflected by the touch object is transmitted to the image detector. Consequently, a transmission distance of the invisible light beam may be increased, while not excessively adding to the size of the touch display apparatus or the size of the backlight module. Therefore, the touch display apparatus and the backlight module according to embodiments of the invention may achieve a small profile. Moreover, according to embodiments of the invention, the touch display apparatus and the backlight module adapt the wedge portion of the image transmission unit to receive the invisible light beam from the touch object. Therefore, if a plurality of touch objects simultaneously approach or touch the display panel and the wedge portion, the images of the touch objects may be formed at different locations on the optical detector, without a blockage issue. Accordingly, the touch display apparatus and the backlight module according to embodiments of the invention may achieve a multi-touch function.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
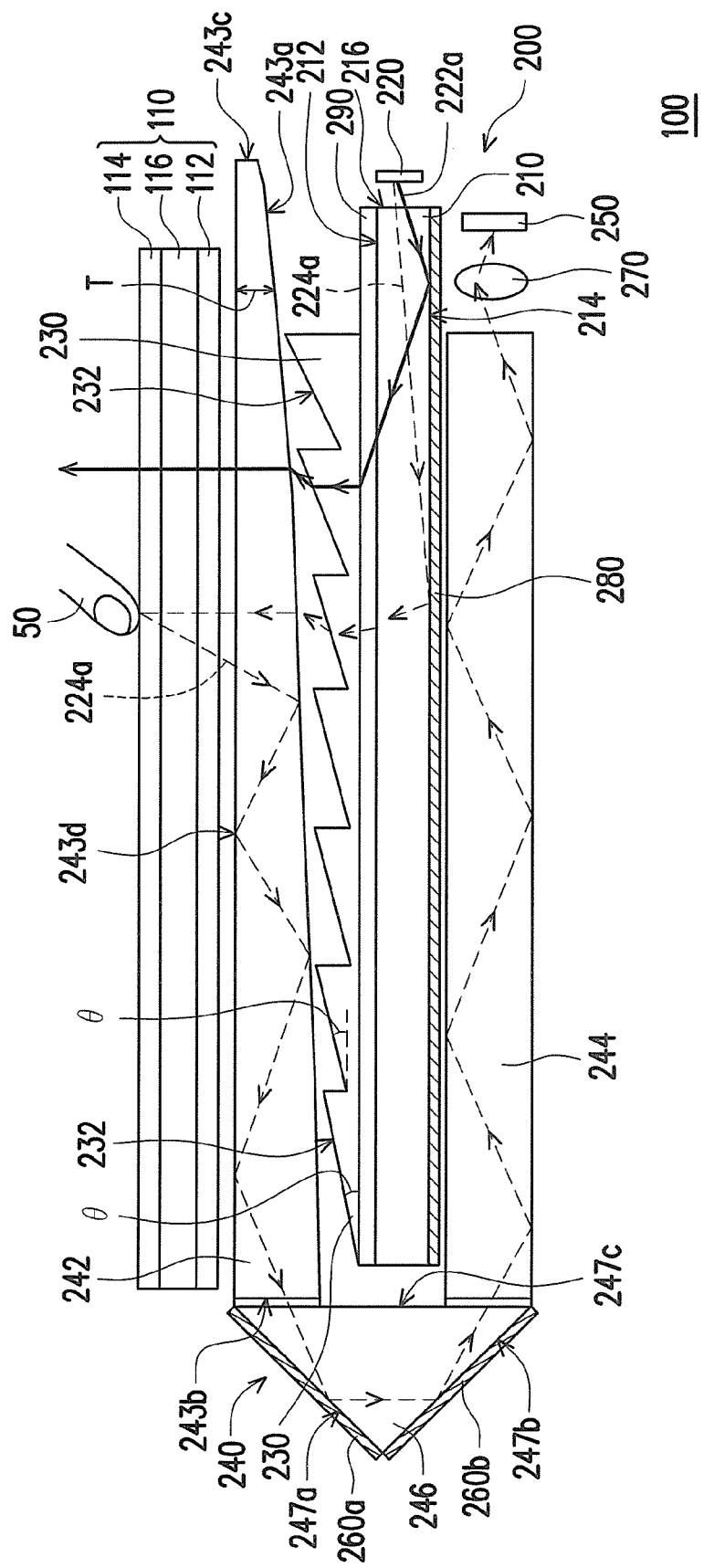
FIG. 1 is a cross-sectional schematic view of a touch display apparatus in accordance with an embodiment of the invention.
Figure 2:
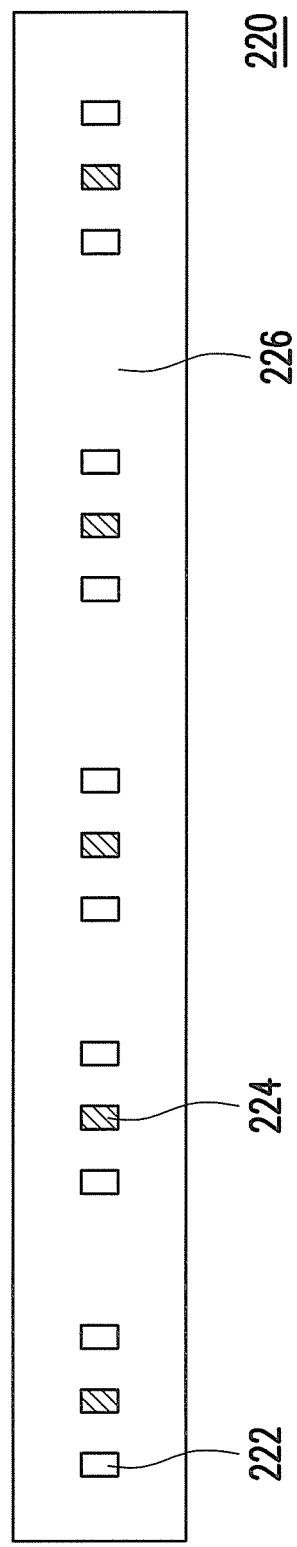
FIG. 2 is a schematic view of a light emitting module depicted in FIG. 1.

Referring to FIG. 1 and FIG. 2, a touch display apparatus 100 of the embodiment includes a backlight module 200 and a display panel 110. The backlight module 200 is adapted to the touch display apparatus 100, and includes a light guide plate 210, a light emitting module 220, a plurality of prism structures 230, an image transmission unit 240, and an image detector 250.

The light guide plate 210 has a first surface 212, a second surface 214 opposite to the first surface 212, and a light incident surface 216 connecting the first surface 212 and the second surface 214. The light emitting module 220 is disposed beside the light incident surface 216, and includes at least a visible light source 222 (e.g., a plurality of visible light sources 222 depicted in FIG. 2), and at least an invisible light source 224 (e.g., a plurality of invisible light sources 224 depicted in FIG. 2). The visible light sources 222 are capable of emitting a visible light beam 222a, and the invisible light sources 224 are capable of emitting an invisible light beam 224a. In the embodiment of the invention, the visible light sources 222 and the invisible light sources 224 are light emitting diodes (LEDs), for example. Specifically, the visible light sources 222 are visible LEDs, for example, and the invisible light sources 224 are infrared LEDs, for instance. Moreover, the invisible light beam 224a is an infrared light beam, for example.

In the embodiment of the invention, the visible light sources 222 and the invisible light sources 224 are arranged in a line, and at least a portion of the invisible light sources 224 is interlaced between at least a portion of the intervals between the visible light sources 222. For example, as illustrated in FIG. 2, the visible light sources 222 and the invisible light sources 224 are periodically arranged, and two visible light sources 222 are interlaced between the two neighboring invisible light sources 224. However, the invention is not limited thereto. In other embodiments of the invention, the visible light sources 222 and the invisible light sources 224 may be arranged in other periodicity, or non-periodic manners, for example, in an alternating arrangement. Moreover, in the embodiment of the invention, the visible light sources 222 and the invisible light sources 224 are disposed on a circuit board 226.

The display panel 110 is disposed at a side of the first surface 212. In the embodiment of the invention, the display panel 110 is a liquid crystal panel, for example, and the display panel 110 includes an active device array substrate 112, a color filter substrate 114, and a liquid crystal layer 116. The active device array substrate 112 is disposed between the first surface 212 and the color filter substrate 114. In addition, the liquid crystal layer 116 is disposed between the active device array substrate 112 and the color filter substrate 114.

The prism structures 230 are disposed on the first surface 212 and configured between the first surface 212 and the display panel 110. In the embodiment of the invention, the backlight module 200 of the touch display apparatus 100 further includes a reflective plate 280 disposed at a side of the second surface 214, so that the reflective plate 280 may reflect the visible light beam 222a and the invisible light beam 224a to the first surface 212. Moreover, in the embodiment, the backlight module 200 of the touch display apparatus 100 further includes an optical film set 290 disposed between the prism structures 230 and the first surface 212. The optical film set 290 includes at least one of a diffuser, a brightness enhancement film, and a prism sheet.

The image transmission unit 240 includes a wedge portion 242 and a light guide portion 244. The wedge portion 242 is disposed between the prism structures 230 and the display panel 110. The visible light beam 222a and the invisible light beam 224a pass through the light incident surface 216, the first surface 212, the prism structures 230, the wedge portion 242, and the display panel 110 in sequence. The wedge portion 242 is a wedge type transparent plate, for example. The visible light beam 222a forms a required backlight source of the display panel 110 after the visible light beam 222a passing through the wedge portion 242. A display frame for a user is formed after the visible light beam 222a passing through the display panel 110.

When a touch object 50 (e.g., a finger of the user, a stylus, or other suitable touch objects) approaches the display panel 110 (e.g., touching the display panel, or remaining close to the display panel 110 while keeping a small distance from the display panel 110), the touch object 50 reflects the invisible light beam 224a from the display panel 110, so that the invisible light beam 224a may pass through the display panel 110, the wedge portion 242, and the light guide portion 244 in sequence. The image detector 250 is disposed beside the light guide portion 244 and capable of receiving the invisible light beam 224a from the light guide portion 244. The light guide portion 244 is a transparent plate, for example. The invisible light beam 224a may be repeatedly reflected in the wedge portion 242 and the light guide plate 244, so that the invisible light beam 224a may be transmitted to the image detector 250 through the wedge portion 242 and the light guide portion 244, and an image may be formed on the image detector 250. In the embodiment of the invention, at least a lens 270 may be disposed between the light guide portion 224 and the image detector 250, so that the image of the invisible light beam 224a may be formed on the image detector 250. The image detector 250 is a charge coupled device (CCD) or a complementary metal-oxide-semiconductor (CMOS) sensor, or other suitable optical detection devices, for example.

In the embodiment, the image transmission unit 240 further includes a prism 246 connecting the wedge portion 242 and the light guide portion 244. The invisible light beam 224a from the wedge portion 242 is transmitted to the light guide portion 244 by the prism 246, and the light guide plate 210 is disposed between the wedge portion 242 and the light guide portion 244. Specifically, in the embodiment of the invention, the prism 246 has a first prism surface 247a, a second prism surface 247b connecting the first prism surface 247a, and a third prism surface 247c connecting the first prism surface 247a and the second prism surface 247b. An end of the third prism surface 247c is glued to the wedge portion 242, and another end of the third prism surface 247c is glued to the light guide portion 244. However, in other embodiments of the invention, the wedge portion 242, the prism 246, and the light guide portion 244 may be integrally formed.

In the embodiment, the backlight module 200 of the touch display apparatus 100 further includes a first reflective unit 260a and a second reflective unit 260b. The first reflective unit 260a and the second reflective unit 260b are respectively disposed at the first prism surface 247a and the second prism surface 247b, so that the invisible light beam 224a may be reflected from the wedge portion 242 to the light guide portion 244. The first reflective unit 260a and the second reflective unit 260b are reflective films, for example. In other embodiments of the invention, the first reflective unit 260a and the second reflective unit 260b may also be reflective plates, although the invention is not limited thereto.

In the embodiment of the invention, each of the prism structures 230 has a light exiting surface 232 facing the wedge portion 242, and the light exiting surface 232 tilts relative to the first surface 212. The wedge portion 242 has a light incident surface 243a facing the prism structures 230, and the light incident surface 243a and the light exiting surface 232 tilt relative to the first surface 212. Moreover, in the embodiment, a light exiting surface 243d of the wedge portion 242 faces away from the light incident surface 243a, and the light exiting surface 243d is a surface substantially parallel to the first surface 212.

In the embodiment of the invention, the wedge portion 242 has a light exiting end 243b and an opposite end 243c opposite to the light exiting end 243b. The light incident surface 243a is connected to the light exiting end 243b and the opposite end 243c. The invisible light beam 224a in the wedge portion 242 is transmitted to the light guide portion 244 through the light exiting end 243b. According to the embodiment, the invisible light beam 224a passes through the light exiting end 243b and the prism 246 in sequence to be transmitted to the light guide portion 244. Moreover, in the embodiment of the invention, a thickness T of the wedge portion 242 in a direction perpendicular to the first surface 212 decreases from the light exiting end 243b toward the opposite end 243c. Furthermore, in the embodiment, a tilt angle θ of the light exiting surface 232 relative to the first surface 212 increases from near the light exiting end 243b toward near the opposite end 243c.

In the embodiment, the light incident surface 243a is a curved surface, and a tilting degree of the light incident surface relative to the first surface 212 (i.e. an included acute angle between the tangent plane of each point on the light incident surface 243a and the first surface 212) increases from the light exiting end 243b toward the opposite end 243c. Therefore, entire images near the position of the display panel 110 may be formed on the image detector 250, and thus the image quality on the image detector 250 may also be improved. Moreover, a difference between the two tilt angles θ of the two neighboring light exiting surfaces 232 relative to the first surface 212 increases from near the light incident end 243b toward near the opposite end 243c. In other words, the tilt angle θ increases non-linearly. Since the tilting of the light incident surface 243a relative to the first surface 212 causes deflection of the visible light beam 222a and the invisible light beam 224a, the embodiment adopts the light exiting surface 232 of the prism structures 230 so that the visible light beam 222a and the invisible light beam 224a are deflected in opposite directions, so that the visible light beam 222a and the invisible light beam 224a may be incident on the display panel 110 in a substantially perpendicular manner. Furthermore, the tilt angle θ increasing non-linearly is corresponding to the effect of that the light incident surface 243a is a curved surface.

However, the invention does not limit the light incident surface 243a to a curved surface. In other embodiments of the invention, the light incident surface 243a may also be a planar surface tilting relative to the first surface 212. Moreover, a difference between the two tilt angles θ of each of the two neighboring light exiting surfaces 232 relative to the first surface 212 is substantially the same. That is, the tilt angle θ may increase linearly.

According to the embodiment of the invention, the touch display apparatus 100 and the backlight module 200 adopts the image transmission unit 240 so that the invisible light beam 224a reflected by the touch object 50 is transmitted to the image detector 250. Consequently, a transmission distance of the invisible light beam 224a may be increased so as to allow a detection range of the image detector 250 to cover the entire display panel, while not excessively adding to the size of the touch display apparatus 100 or the size of the backlight module 200. Particularly, since the embodiment adopts the prism 246 to fold an optical path of the image transmission unit 240, the size of the touch display apparatus 100 or the size of the backlight module 200 may be further reduced. The touch display apparatus 100 according to the embodiment may be flattened to achieve a small profile. Therefore, the touch display apparatus 100 according to the embodiment has a wide range of applicability, while not intruding upon the knee space of a user when the user is seated.

Moreover, according to the embodiment of the invention, the touch display apparatus 100 and the backlight module 200 adopt the wedge portion 242 of the image transmission unit 240 to receive the invisible light beam 224a from the touch object 50. Therefore, when a plurality of touch objects 50 simultaneously approach or touch the display panel 110, the images of the touch objects 50 may be formed at different locations on the image detector 250, so that a mutual blockage issue may not occur. Therefore, the touch display apparatus 100 and the backlight module 200 according to the embodiment may achieve a multi-touch function.

Figure 3:
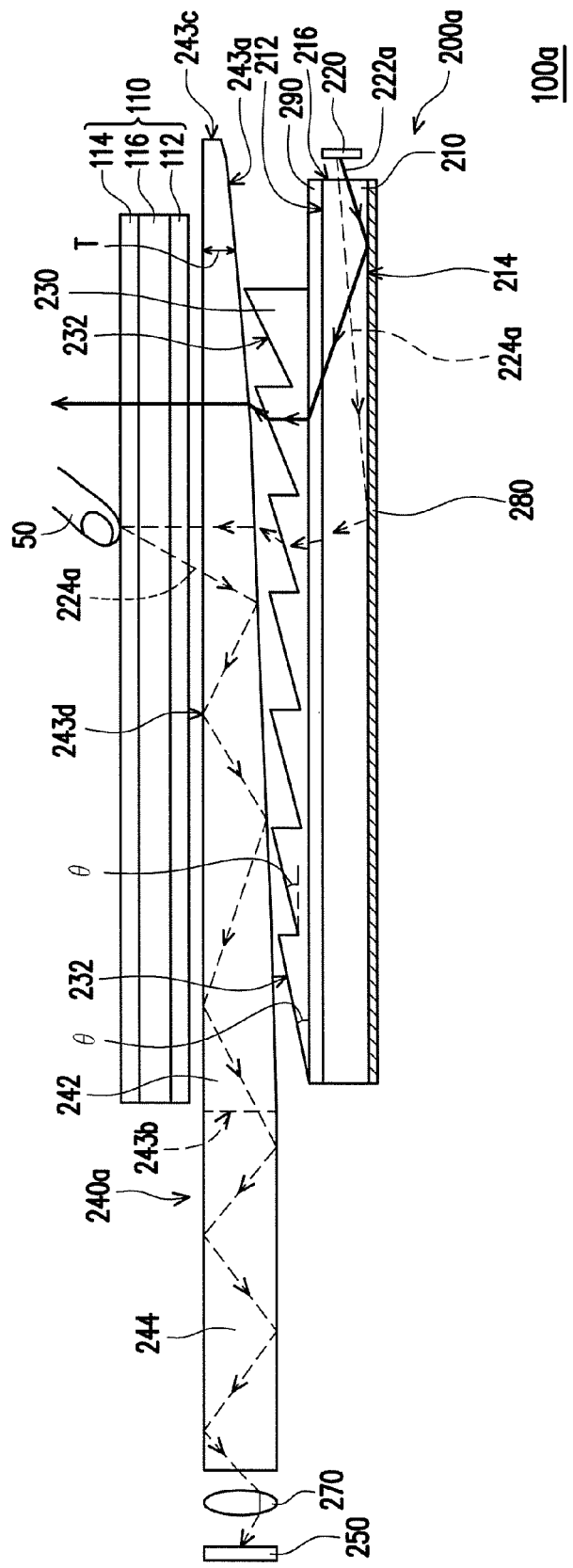
FIG. 3 is a cross-sectional schematic view of a touch display apparatus in accordance with another embodiment of the invention.

Referring to FIG. 3, a touch display apparatus 100a of the present embodiment is similar to the touch display apparatus 100 in FIG. 1, and the differences between the touch display apparatus 100a and the touch display apparatus 100 are described below. In the embodiment, an image transmission unit 240a of a backlight module 200a does not have the prism 246 depicted in FIG. 1. Moreover, the light guide portion 244 is connecting to the wedge portion 242, and the light guide portion 244 is disposed in an extended direction of the wedge portion 242. The light guide portion 244 is a planar plate, for example, and is configured to transmit the invisible light beam 224a from the wedge portion 242 to the image detector 250.

The touch display apparatus 100a according to the embodiment of the invention has similar advantages as the touch display apparatus 100 depicted in FIG. 1, so no further description is provided herein.

In summary, the embodiment or the embodiments of the invention may have at least one of the following advantages. According to embodiments of the invention, the touch display apparatus and the backlight module adopt the image transmission unit so that the invisible light beam reflected by the touch object is transmitted to the image detector. Consequently, the transmission distance of the invisible light beam may be increased, while not excessively adding to the size of the touch display apparatus or the size of the backlight module. Therefore, the touch display apparatus and the backlight module according to embodiments of the invention may achieve a small profile. Moreover, according to embodiments of the invention, the touch display apparatus and the backlight module adopt the wedge portion of the image transmission unit to receive the invisible light beam from the touch object. Therefore, when a plurality of touch objects simultaneously approach or touch the display panel and the wedge portion, the images of the touch objects may be formed at different locations on the optical detector without a blockage issue. Accordingly, the touch display apparatus and the backlight module according to embodiments of the invention may achieve a multi-touch function.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A touch display apparatus, comprising:
  a light guide plate having a first surface, a second surface opposite to the first surface, and a light incident surface connecting the first surface and the second surface;
  a light emitting module disposed beside the light incident surface and comprising at least one visible light source and at least one invisible light source, wherein the visible light source is capable of emitting a visible light beam, and the invisible light source is capable of emitting an invisible light beam;
  a display panel disposed at a side of the first surface;
  a plurality of prism structures disposed between the first surface and the display panel;
  an image transmission unit, comprising:
    a wedge portion disposed between the prism structures and the display panel; and
    a light guide portion, wherein the light incident surface, the first surface, the prism structures, the wedge portion, and the display panel are capable of being passed through in sequence by the visible light beam and the invisible light beam, and a touch object reflects the invisible light beam from the display panel when the touch object approaches the display panel, so that the invisible light beam passes through the display panel, the wedge portion, and the light guide portion in sequence; and an image detector disposed beside the light guide portion and capable of receiving the invisible light beam from the light guide portion.

2. The touch display apparatus as claimed in claim 1, wherein the image transmission unit further comprises a prism connecting the wedge portion and the light guide portion, the prism is capable of transmitting the invisible light beam from the wedge portion to the light guide portion, and the light guide plate is disposed between the wedge portion and the light guide portion.

3. The touch display apparatus as claimed in claim 2, wherein the prism has a first prism surface, a second prism surface connecting the first prism surface, and a third prism surface connecting the first prism surface and the second prism surface, an end of the third prism surface is glued to the wedge portion, another end of the third prism surface is glued to the light guide portion, the touch display apparatus further comprises a first reflective unit and a second reflective unit, and the first reflective unit and the second reflective unit are respectively disposed on the first prism surface and the second prism surface, so as to reflect the invisible light beam from the wedge portion to the light guide portion.

4. The touch display apparatus as claimed in claim 1, wherein the light guide portion is connected to the wedge portion, and the light guide portion is disposed in an extended direction of the wedge portion.

5. The touch display apparatus as claimed in claim 1, wherein each of the prism structures has a light exiting surface facing the wedge portion, the light exiting surface tilts relative to the first surface, the wedge portion has a light incident surface facing the prism structures, and the light incident surface and the light exiting surface tilt relative to the first surface.

6. The touch display apparatus as claimed in claim 5, wherein the wedge portion has a light exiting end and an opposite end opposite to the light exiting end, the light incident surface connects the light exiting end and the opposite end, the light exiting end is capable of transmitting the invisible light beam to the light guide portion, and a thickness of the wedge portion in a direction perpendicular to the first surface decreases from the light exiting end toward the opposite end.

7. The touch display apparatus as claimed in claim 6, wherein a tilt angle of the light exiting surfaces of the prism structures relative to the first surface increases from near the light exiting end toward near the opposite end.

8. The touch display apparatus as claimed in claim 7, wherein the light incident surface is a curved surface, and a tilting degree of the light incident surface relative to the first surface increases from the light exiting end toward the opposite end, and a difference between the two tilt angles of the two neighboring light exiting surfaces relative to the first surface increases from near the light incident end toward near the opposite end.

9. The touch display apparatus as claimed in claim 7, wherein the light incident surface is a planar surface, and a difference between the two tilt angles of each of the two neighboring light exiting surfaces relative to the first surface is substantially the same.

10. The touch display apparatus as claimed in claim 1, wherein the at least one visible light source is a plurality of visible light sources, and the at least one invisible light source is a plurality of invisible light sources, the visible light sources and the invisible light sources are arranged in a line, and at least a portion of the invisible light sources is interlaced between at least a portion of intervals between the visible light sources.

11. The touch display apparatus as claimed in claim 1, wherein the display panel is a liquid crystal panel.

12. The touch display apparatus as claimed in claim 1, further comprising a reflective plate disposed at a side of the second surface.

13. The touch display apparatus as claimed in claim 1, further comprising an optical film set disposed between the prism structures and the first surface, wherein the optical film set comprises at least one of a diffuser, a brightness enhancement film, and a prism sheet.

14. A backlight module adapted to a touch display apparatus, the backlight module comprising:

a light guide plate having a first surface, a second surface opposite to the first surface, and a light incident surface connecting the first surface and the second surface;

a light emitting module disposed beside the light incident surface, comprising at least one visible light source and at least one invisible light source, wherein the visible light source is capable of emitting a visible light beam, and the invisible light source is capable of emitting an invisible light beam;

a plurality of prism structures disposed on the first surface;

an image transmission unit, comprising:

a wedge portion, wherein the prism structures are disposed between the first surface and the wedge portion; and a light guide portion, wherein the light incident surface, the first surface, the prism structures, and the wedge portion are capable of being passed through in sequence by the visible light beam and the invisible light beam, and a touch object reflects the invisible light beam from the wedge portion when the touch object approaches the wedge portion, so that the invisible light beam passes through the wedge portion and the light guide portion in sequence; and an image detector disposed beside the light guide portion, so as to receive the invisible light beam from the light guide portion.

15. The backlight module as claimed in claim 14, wherein the image transmission unit further comprises a prism connecting the wedge portion and the light guide portion, the prism is capable of transmitting the invisible light beam from the wedge portion to the light guide portion, and the light guide plate is disposed between the wedge portion and the light guide portion.

16. The backlight module as claimed in claim 14, wherein each of the prism structures has a light exiting surface facing the wedge portion, the light exiting surface tilts relative to the first surface, the wedge portion has a light incident surface facing the prism structures, and the light incident surface and the light exiting surface tilt relative to the first surface.

17. The backlight module as claimed in claim 16, wherein the wedge portion has a light exiting end and an opposite end opposite to the light exiting end, the light incident surface connects the light exiting end and the opposite end, the light exiting end is capable of transmitting the invisible light beam to the light guide portion, and a thickness of the wedge portion in a direction perpendicular to the first surface decreases from the light exiting end toward the opposite end.

18. The backlight module as claimed in claim 17, wherein a tilt angle of the light exiting surfaces of the prism structures relative to the first surface increases from near the light exiting end toward near the opposite end.

19. The backlight module as claimed in claim 18, wherein the light incident surface is a curved surface, and a tilting degree of the light incident surface relative to the first surface increases from the light exiting end toward the opposite end, and a difference between the two tilt angles of the two neighboring light exiting surfaces relative to the first surface increases from near the light incident end toward near the opposite end.

20. The backlight module as claimed in claim 18, wherein the light incident surface is a planar surface, and a difference between the two tilt angles of each of the two neighboring light exiting surfaces relative to the first surface is substantially the same.

* * * * *